(No Model.)
J. C. DUPEE.
CALF WEANER.
No. 257,481. Patented May 9, 1882.
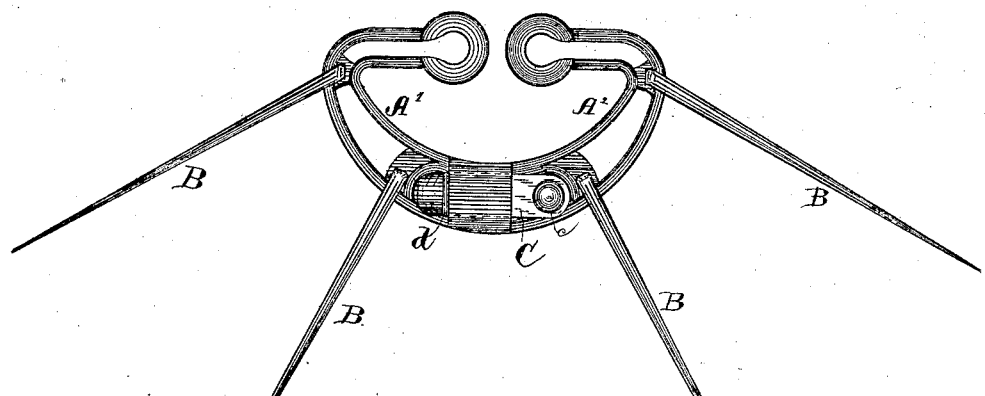
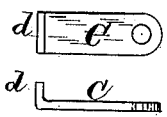
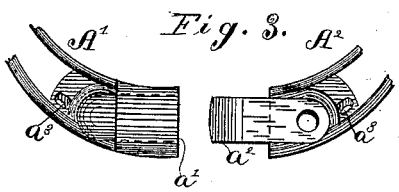
Witnesses:
Geo Leforger
A. Leforger
Inventor,
John C. Dupee

UNITED STATES PATENT OFFICE.

JOHN C. DUPEE, OF DECATUR, ILLINOIS.

CALF-WEANER.

SPECIFICATION forming part of Letters Patent No. 257,481, dated May 9, 1882.

Application filed March 13, 1882. (No model.)

*To all whom it may concern:*

Be it known that I, JOHN C. DUPEE, a citizen of the United States, residing at Decatur, in the county of Macon and State of Illinois, have invented a new and useful Improvement in Calf-Weaners, of which the following is a specification.

My invention relates to a new and useful improvement in calf-weaners, the object of which is to provide a light, durable, and effective weaner, with a joint so constructed that it may be secured to the animal's nose simply by inserting the globe ends into the nostrils and uniting the two sections by slipping one part within the other. The sections thus united are securely held together by a flat spring-catch, each section being provided with barbs or prongs, all of which will hereinafter be more fully described. I attain these objects by the device illustrated in the accompanying drawings, in which—

Figure 1 represents the weaner complete, the sections being united and each provided with prongs or barbs. Fig. 2 represents one section, the stem of which is provided with a spring-catch. Fig. 3 is a top or plan of the joint, the spring being removed from the stem, and each part being represented as it appears when taken from the molding-sand. Fig. 4 represents the barb or prong having a shank or lateral stem, by means of which it is secured to sections of the weaner. Fig. 5 is a top and side view of the spring, which is bent transversely at one of its ends, its opposite end having a hole by means of which it is secured to the stem of one of the sections by a rivet.

Similar letters refer to similar parts throughout the several views.

A' and A² represent the two sections as parts of the weaner, and are cast from malleable iron in an open skeleton form to reduce their weight, webs being formed at intervals on each part, through which holes $a^3$ are formed to receive the stem or shank of the barbs or prongs B. These prongs are secured to each section of the weaner, in the manner shown, by bending the end of the shank down upon the web or by overheading the end to prevent its loosening or falling out, the prongs being cast separate and afterward united in the manner before described. It will be obvious that these prongs may be made of wire, the points being cut on a long bevel and secured to the weaner in the same manner before described.

C is a spring-catch having a hole at one end, by which it is secured to the stem $a^2$ of the part A² with a rivet, its opposite end being bent up at right angle to its length, as at $d$, Figs. 2 and 5, the stem $a^2$ being flat on one side to form a seat for the spring and to admit of its upturned end $d$ to pass into the hole $a'$ of the part A'. The length of the circular portion of the part A' is such as will allow the upturned end $d$ of the spring to catch upon its rear edge when the two parts are put together, as clearly shown in Fig. 1. The two sections or parts being thus united, they can only be separated by pressing down on the end $d$ of the spring until it can be pulled out of the hole $a'$. The end of the spring does not extend past the largest diameter of the circular part of the joint, so it is impossible for the animal wearing the weaner to detach it in any conceivable way, either by catching it on roots, branches, or a fence.

It will be obvious that the spring may be made of wire, one end of which can be passed through the rivet-hole in the stem $a^2$, and overheaded to hold it in place, the other end being bent, the same as the one shown, and adapted to operate in the same manner and for the same purpose.

It is also obvious that the prongs may be cast solid with the two sections; but it is cheaper to make them separate and fasten them in the manner set forth.

I am aware that calf-weaners have been made with long acute prongs, and with globe-points which fit within the nostrils; also with a variety of differently-constructed joints. I therefore do not claim these elements, broadly; but,

Having thus described my invention, what I do claim as new, and desire to secure by Letters Patent, is—

1. A calf-weaner consisting of the parts A' and A², the part A' having a circular portion, and central hole within said circular portion, the part A² having a stem, a², adapted to fit within the central hole, a', of the part A', in combination with the spring-catch C, secured to the stem a² by a rivet, or otherwise, and adapted to pass into the central hole, a', and hook onto the rear edge of said circular portion, substantially as and for the purpose specified.

2. A calf-weaner formed, substantially as shown, with an open skeleton frame, having webs at intervals formed across the openings, the webs being provided with holes a³, by means of which the prongs B B are united with the body, substantially as shown.

JOHN C. DUPEE.

Witnesses:
GEO. LEFORGEE,
A. LEFORGEE.